Figure 2:
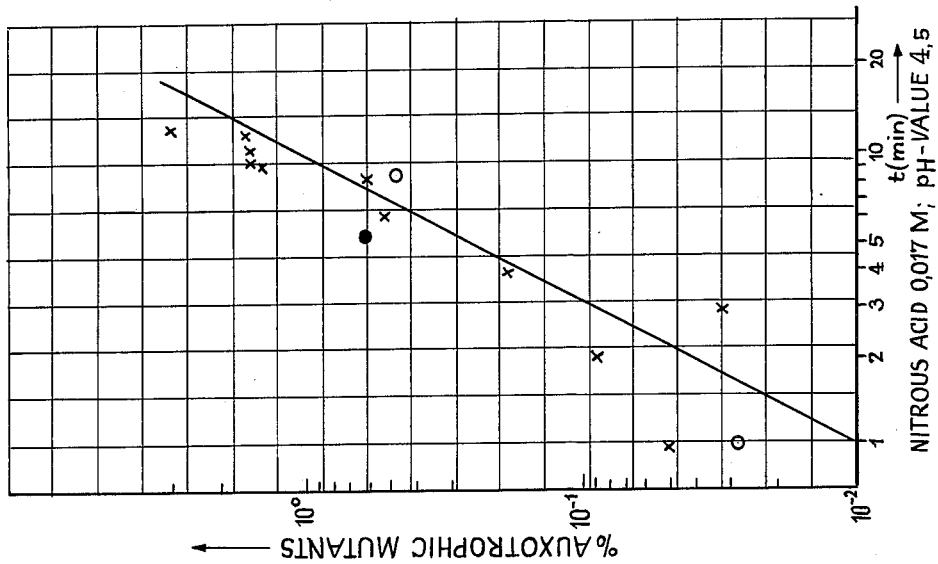

INVENTOR
FRITZ KAUDEWITZ

United States Patent Office 3,085,946
Patented Apr. 16, 1963

3,085,946
PROCESS FOR THE PRODUCTION OF MUTANTS OF VEGETABLE BACTERIA AND SPORES OF LOWER FUNGI
Fritz Kaudewitz, Tubingen, Germany, assignor to Behringwerke Aktiengesellschaft, Marberg (Lahn), Germany, a corporation of Germany
Filed Mar. 1, 1960, Ser. No. 12,099
Claims priority, application Germany Mar. 4, 1959
7 Claims. (Cl. 195—78)

It is already known that mutants of the tobacco mosaic virus can be produced in vitro by subjecting the viruses or their isolated ribonucleic acids to the action of nitrous acid as mutagenic substance (Ztschr. für Vererbungslehre, 89, 614 (1958); Nature, 182, 145 (1958)).

Now it has been found that mutants of vegetable microorganisms such as bacteria and lower fungi can be obtained by subjecting vegetable microorganisms to the action of nitrous acid as mutagenic substance.

It can be of advantage if the nitrous acid, for example in the bacterial suspension, is set free from alkali metal nitrites by means of a dilute and weak acid or is produced by introduction of nitrogen oxides e.g. dinitrogen trioxide, the anhydride of nitrous acid.

The process of the present invention can be carried out at a weakly acid to about neutral reaction, for example at a pH value of 4.5. The reaction proceeds more rapidly with a decreasing pH value. The reaction periods applied may be within a range of seconds and minutes. The reaction temperature is limited by the stability of the materials to be mutated.

It is sometimes of advantage if the nitrous acid that has not reacted is eliminated after treatment of the vegetable microorganisms. The nitrous acid can be eliminated from the suspension of vegetable microorganisms, for example, by dialysis; it is also possible to effect the separation from the nitrous acid in excess by washing or centrifuging of the material or to stop the reaction by varying the pH value or by cooling to low temperatures.

The mutants prepared according to the process of the present invention are classified according to the intended use. Apathogenic forms of the bacteria are of importance for active immunization in human and veterinary medicine. The process permits obtaining mutants of a lower order of fungi showing a deviating spectrum of antibiotica. There can also be produced completely new mutants. The preparation of the mutants is much less complicated and the yield obtained is much higher than when making use of the hitherto known mutagenic processes.

When applying a shorter time of reaction there are isolated mutants which differ from the original material by a single mutation step.

With the increasing time of reaction the number of mutants rises, as does the probability of the occurrence of multiple mutants, that is to say of several mutations in one cell.

Consequently, nitrous acid exerts a mutagenic action on the cells of vegetable microoganisms thus reducing the ability of a suspension of such microorganisms to form colonies. The mutagenic effect varies according to possible differences in the state of metabolism of the cells treated.

If, for example, wild-type cells of E. coli, strain B which had survived treatment with nitrous acid, are used and plated on nutrient agar so as to give about 150 colonies per plate, their synthetic abilities for amino acids can be tested by replica-plating the colonies on a minimal medium (cf. J. Lederberg and E. H. Lederberg, J. Bact. 63, 399 (1952)). Since this minimal medium contains only glucose and inorganic salts, it supports the growth of the wild-type strain but inhibits the multiplication of cells which had mutated to auxotrophy. Using this technique the bacteria can be identified as auxotrophic mutants induced by treatment with nitrous acid. The application of a method published by F. Kaudewitz, W. Vielmetter, and H. Friedrich-Freska (Z. Naturforschung, 13b, 793 (1958)) permits characterization of the mutants as regards their growth requirements.

Thus, nitrous acid is a potent mutagen. With an inactivation rate of $10^{-5}$ about 4% of the surviving cells are auxotrophic mutants, as shown in the accompanying drawings.

The production of auxotrophic mutants used as model follows in the range tested (up to 4% of the surviving cells were auxotrophic mutants) a double-hit curve (see FIGURE 2).

The following examples refer to the induction of mutants according to the process of the present invention in Escherichia coli, strain B and Salmonella typhimurium, strain LT 2. In accordance therewith, cells of lower fungi can likewise be subjected to the mutagenic action of nitrous acid.

A successful mutation with sodium nitrite could not be expected straight away in the case of bacteria and lower fungi since, as microorganisms, these are built up in a much more complicated manner than viruses and partly even possess an acidproof membrane and show many possibilities of reaction for the molecules of the nitrous acid when the latter have penetrated through the membrane into the cell until they have arrived at the nucleic acid and can react therewith.

The following examples serve to illustrate the invention but they are not intended to limit it thereto:

EXAMPLE 1

(a) *Mutagenic Action of Nitrous Acid on Escherichia coli, Strain B*

1 milliter of a suspension of resting cells of Escherichia coli, strain B, having a cell titer of $5.10^8$/ml. is reacted, at 37° C., with 1 ml. of a 0.05 molar solution of nitrous acid and 1 ml. of a 0.6 molar acetate buffer at a pH value of 4.5.

(b) *Mutagenic Action of Nitrous Acid on Salmonella typhimurium, Strain LT 2*

The same reaction is carried out under the same conditions as described under (a) while using cells of Salmonella typhimurium, strain LT 2.

Figure 1:
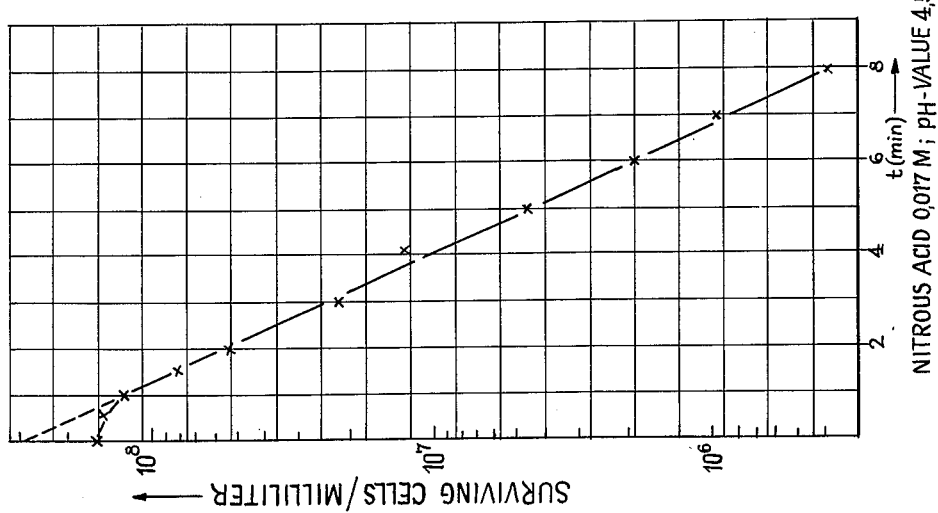

The time of treatment results each time from FIGURES 1 and 2, FIGURE 1 indicating the number of surviving cells per milliliter.

FIGURE 2 illustrates the relation between the percentage of induced mutants from the surviving cells according to curve 1 and the time of treatment up to 20 minutes, under the conditions indicated above. In these diagrams × means resting cells of *Escherichia coli*, strain B;
● means cells of a growing culture of *E. coli*, strain B;
○ means resting cells of *Salmonella typhimurium*, strain LT 2.

The table shows the nutritional requirements found in auxotrophic mutants which were induced by incubation of wild-type cells of *Escherichia coli*, strain B, according to Example 1a.

EXAMPLE 2

*Mutagenic Action of Nitrous Acid on Streptomycetes*

Spores of a strain of Streptomycetes cultivated on an oatmeal agar, for example of a tetracycline-forming strain of Streptomycetes, are washed off by means of 5 ml. of physiological sodium chloride solution. The spore suspension is brought for some minutes into a high-speed homogenizer and then filtered under sterile conditions through a Whatmann filter paper No. 2. By this treatment there are obtained single spores (more than 90%) as is found by microscopic examination. The spore suspension is adjusted to a titer of about $10^{10}$ spores per milliliter.

1 milliliter of a 0.05 molar solution of nitrous acid and 1 milliliter of a 0.6 molar acetate buffer having a pH value of 4.5 are caused to act upon 1 ml. of the above spore suspension at a temperature of 30° C. After one minute each, samples are taken of the spore suspension so treated and plated on a suitable solid nutrient agar, for example on Waksman agar. The inoculated nutrient plates are incubated for 5 days at 28° C. After this time there are found on the plates various types of mutants differing from the initial strain by color, growth, sporability and other properties.

Whereas the initial strain, for example the tetracycline-forming strain of Streptomycetes forms on Waksman-agar uniform colonies having a diameter of 3 to 5 mm. and a brownish surface with a central "button" but without a spore layer, mutants of various types are formed after treatment of the spores with nitrous acid. When the colonies of the initial strain are inoculated on oatmeal agar, there is always formed a grayish-white spore layer. Mutants were then found which, after inoculation on oatmeal agar, no longer showed any spores on the surface, that is to say that they no longer formed a spore-carrying air mycelium. Other mutants differed from the initial strain insofar as the surface of their colonies was no longer brownish but colorless and did not show any central "button" formation. Finally, there were obtained mutants forming dwarf colonies whose diameter only amounted to about 0.5 mm.

TABLE

| Tested additions for auxotrophic mutants | Number of auxotrophic mutants found |
|---|---|
| Adenine | 12 |
| Adenine or Guanine | 0 |
| Guanine | 3 |
| Cytosine | 0 |
| Cytosine or Uracil | 10 |
| Thymin | 1 |
| Argenine | 19 |
| Aspartic acid | 1 |
| Cysteine | 4 |
| Cysteine or Methionine | 5 |
| Glutamic acid | 1 |
| Glycine | 0 |
| Glycine or Serine | 0 |
| Histidine | 18 |
| Isoleucine | 4 |
| Isoleucine or Valine | 0 |
| Leucine | 8 |
| Lysine | 8 |
| Methionine | 11 |
| Phenylalanine | 0 |
| Phenylalanine or Tyrosine | 0 |
| Proline | 5 |
| Proline or Glutamic acid | 1 |
| Serine | 1 |
| Threonine | 3 |
| Tryptophane | 12 |
| Tyrosine | 3 |
| Valine | 7 |
| Ascorbic acid | 0 |
| Nicotinic acid | 1 |
| Pantothenate | 0 |
| Pyridoxal-Phosphate | 0 |
| Pyridoxal-Phosphate or glutamic acid | 1 |
| Riboflavin | 0 |
| Riboflavin or Nicotinic acid amide | 3 |

I claim:
1. A process for the mutation of vegetable microorganisms selected from the group consisting of bacteria and spores of lower fungi which comprises contacting said vegetable microorganisms for a time up to 20 minutes with nitrous acid under weakly acid to about neutral conditions.

2. A process as in claim 1 wherein said vegetable microorganisms are bacteria.

3. A process as in claim 1 wherein said vegetable microorganisms are spores of lower fungi.

4. A process as in claim 1 wherein said vegetable microorganisms are Streptomycetes.

5. A process as in claim 1 wherein said nitrous acid is contacted with an aqueous suspension of said vegetable microorganisms.

6. A process as claimed in claim 5, which comprises liberating the nitrous acid in the suspension of vegetable microorganisms by means of dilute weak acid from alkali metal nitrites.

7. A process as claimed in claim 5, which comprises producing the nitrous acid in the suspension of vegetable microorganisms by introduction of dinitrogen trioxide.

References Cited in the file of this patent

Lilly et al.: "Physiology of the Fungi," McGraw-Hill Book Co., Inc., New York (1951), pp. 414 and 415.

Foster: "Chemical Activities of Fungi," Academic Press Inc., pub. New York (1949), pp. 213 to 215.